Patented Mar. 9, 1954

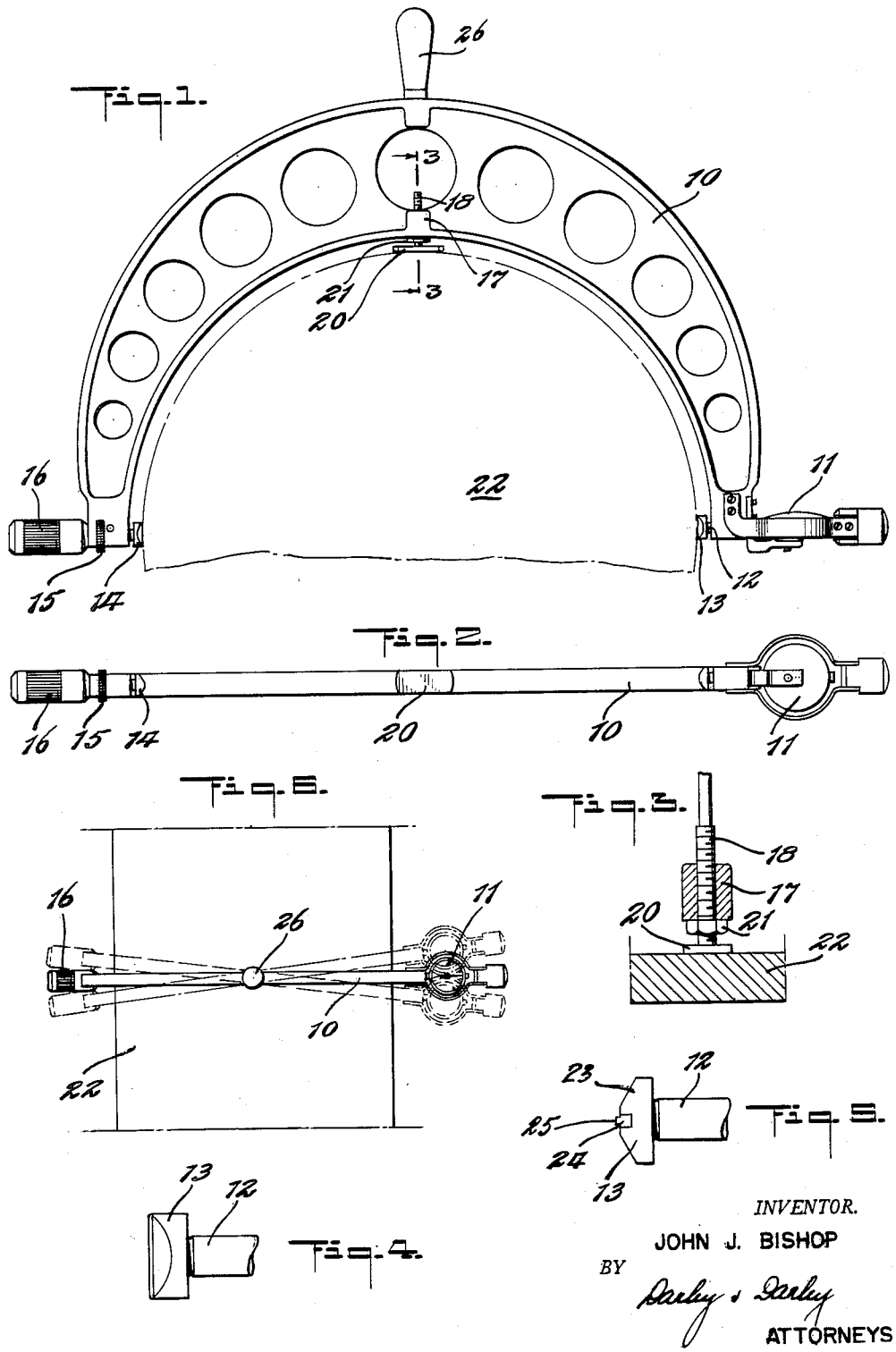

2,671,272

UNITED STATES PATENT OFFICE 2,671,272

DIAL SNAP GAUGE

John J. Bishop, Poughkeepsie, N. Y., assignor to Standard Gage Company, Inc., Poughkeepsie, N. Y., a corporation of New York Application February 8, 1950, Serial No. 143,075

6 Claims. (Cl. 33—147)

The present invention relates to dial snap gages and particularly to such gages adapted for gaging the outside diameters of cylindrical work and particularly of large cylindrical pieces.

The gaging of outside diameters of large cylindrical work has commonly been done by using ordinary screw type micrometers. In some instances dial type snap gages have also been used but not ordinarily when the diameter was greater than about 24 inches. When dial snap gages were utilized they were commonly of the type having one spherically faced anvil opposed by a flat anvil, the flat anvil being spring-pressed against the work and intended to square the gage on the work by virtue of this spring pressure.

The use of either a large micrometer or a large snap gage requires great skill since errors occur both due to the flexibility of the frame and the difficulty of properly supporting the frame and likewise because of the high degree of skill necessary for the operator to determine by feel, the squareness of the gage with the work.

As can readily be seen, it is extremely difficult for an operator to properly determine the correct position of a gage on a cylindrical piece of, for example, a 40 inch diameter. A micrometer of such dimensions will weigh in the neighborhood of 13 to 15 pounds if it is formed of a material of considerable rigidity such as is normally necessary. The operator has to handle this weight and at the same time determine, by feel, when the micrometer is reading the maximum dimension, that is, the diameter, and likewise be certain that the micrometer axis is exactly perpendicular to the axis of the cylindrical piece being gaged.

On the other hand, if the micrometer is made with a frame of a lighter material such as aluminum, either solid or in tubular form, the weight is less but the rigidity of the frame is likewise decreased and the accuracy of measurement lessened due to springing of the frame. The use of the common dial snap gage has substantially all of the disadvantages of the micrometer as discussed above.

In my present invention I provide a dial snap gage which may be easily utilized in measuring diameters of large cylinders. The method, while of particular value in connection with cylinders above 30 inches in diameter, is likewise valuable in connection with the measurement of smaller cylinders.

Essentially my invention comprises the provision of means whereby the weight of the snap gage may be supported on the work piece, thus permitting of light gaging contact pressures and assuring minimization of frame stresses. I further provide a balancing weight at the end of the frame opposite the dial indicator which helps to balance the frame in its position on the work being gaged. Additionally, the gaging anvils are provided with narrow flat contact surfaces in alignment with each other and with the central plane of the frame.

It will be obvious that since most large cylindrical work is machined while in a horizontal position, the gage of my present invention is applicable to the measurement of large cylindrical work in a very large proportion of all cases.

As set forth above, in utilizing the gage of my invention the gage is balanced on the work and in order to read the diameter the operator merely oscillates the indicator from side to side through an angle of approximately 2° and notes the minimum reading of the dial indicator which reading is, of course, the diameter of the piece. As can be seen, one advantage of this method of gaging is that the indicator frame can be made light and easily handled without any sacrifice in precision since the balanced position avoids stress variations which invariably occur when a gage is supported by the hands.

It is an object of this invention to provide a dial indicator gage adapted to be balanced on the work, and capable of checking cylinder diameters particularly diameters exceeding 30 inches.

It is a further object of the invention to provide a dial indicator with an adjustable rest located on the inner surface of the indicator frame whereby the frame may be supported on the work while a reading of diameter is taken.

It is another object of the invention to provide a dial snap gage of the type described in which a balancing weight is provided on the frame end opposite the indicator to thereby assure that the gage may rest upon the piece being gaged and be balanced in a substantially horizontal position.

It is a further object of the invention to provide gaging anvils of a form permitting minor variations in the position of the gaging rest without affecting the gaging accuracy.

Other objects and features of the invention will appear when the following description is considered in connection with the appended drawings, in which, Figure 1 is a front elevation of the dial snap gage of my invention showing the indicator positioned upon a large cylindrical piece, the diameter of which is to be measured;

Figure 2 is a bottom plan view of the dial snap gage of Figure 1;

Figure 3 is a detailed fragmentary cross-sectional view taken on the plane of the line 3—3 of Figure 1 showing particularly the construction of the adjustable gage rest;

Figure 4 is a side elevation of one of the gaging anvils. This figure is on an enlarged scale as compared with other figures of the drawings;

Figure 5 is a top plan view of the gaging anvil of Figure 4; and

Figure 6 is a top plan view showing a cylindrical work piece with my gage in position thereon. This figure also shows in dotted lines the manner in which the gage is oscillated in order to secure an indication of the diameter of the cylinder gaged.

Referring now to the drawings, there is shown at 10 the usual U-shaped gage frame which may be made of cast iron, but is preferably made of lighter material such as aluminum, since, as has been pointed out, great rigidity of the frame is not essential when my improved gage is utilized.

Mounted at the end of one arm of the U-shaped frame 10 is a dial indicator gage of usual form such as shown at 11. This gage may be mounted in any suitable manner such for example as that described in the copending application of Erik H. Aldeborgh, Serial No. 127,624, filed November 16, 1949, now Patent No. 2,560,203, issued July 10, 1951.

The plunger of the dial indicator cooperates with the plunger 12 in the manner described in the Aldeborgh application mentioned, the plunger 12 being provided at its end with a gaging anvil 13 which will be described hereinafter.

At the opposite extremity of the U-shaped frame 10 the opposed gaging anvil 14 is mounted, this anvil being adjustable, within limits, and being locked in its adjusted position by means of the adjusting nut 15 and lock nut 16. The particular locking arrangement is not described in detail since it forms the subject matter of the copending application of Erik H. Aldeborgh, Serial No. 129,273, filed November 25, 1949, now Patent No. 2,640,270, issued June 2, 1953.

The frame 10 of the indicator of my present invention is formed with a boss 17 which boss is provided with a tapped hole. Into the tapped hole a screw 18, having a rectangular head 20, is threaded. As is readily seen, the position of the plate or screw head 20 relatively to the gage frame 10 may be readily adjusted. Screw 18 is held in its adjusted position by means of a lock nut 21 of usual form.

As is readily seen in Figure 1, the screw head or plate 20 serves as a rest for the gage so that the frame 10 may rest directly upon the piece 22 to be gaged, thus obviating all strains and stresses upon the gage frame which result from support by an operator. In adjusting the position of the screw 18 a master cylinder is of course utilized so that the anvils 12 and 14 will lie approximately on the center line of the piece to be gaged, it being of course assumed that the master cylinder and the piece to be measured will be of diameters differing by only a few hundredths of an inch at the most. It is further essential that the master cylinder, the gage and the work be at the same temperature so that unequal rates of expansion will not affect the accuracy of reading.

The gaging anvils 13 and 14 are identical, each being circular and comprising a thicker central portion 23 in which a narrow band 24 of long wearing material, such as tungsten carbide, is inserted. The band 24 is formed with a still narrower flat projection 25 which protrudes beyond the face of the anvil 13 and which forms the actual gaging surface. It should be noted at this point that the diameter of the gaging anvil is relatively great so that the exact position of the gage, as determined by the rest or plate 20, is unimportant. It should furthermore be noted that although round gaging anvils are shown in Figures 4 and 5, having the gaging band 25 extending on a vertical diameter thereof, it may be desirable in some instances to utilize square gaging anvils with the band 25 positioned to extend vertically adjacent one edge in order that a cylindrical piece may be checked for diameter closely adjacent to a shoulder on the cylinder.

In order to balance the gage upon the rest 20 a suitable weight is provided on the end of the frame carrying the anvil 14. In the specific embodiment shown, this weight is provided by utilizing a very large and heavy lock nut 16 to counterbalance the dial indicator 11 and its mounting and thus balance the gage upon the rest 20. Obviously, the weight may be supplied separate from the lock nut 16 if desired.

As is clear from Figures 1 and 6, the gage is utilized by first adjusting it on the master cylinder to the desired diametrical measure and at the same time adjusting the rest 20 so that the gage will be supported with the anvils 13 and 14 on the center line of the master. With the gage so set, it is then placed upon the work in the manner shown in the figures mentioned above. Then the operator grasps the handle 26 and oscillates the entire gage, about the rest 20 as a pivot point, through an angle of approximately 2°. In Figure 6 the limits of oscillation have been shown in dotted lines, the angle of oscillation being of course greatly exaggerated. As this oscillating movement is performed the operator observes the indicator and reads the minimum indication which is the diameter of the piece measured.

When utilizing the gage above-described it is entirely practical to measure the diameters of cylindrical work-pieces in the range of from 24 inches upward with an accuracy of at least as great as one ten thousandth of an inch (0.0001").

While I have described the preferred embodiment of my invention it will be understood that other modifications may be made within the scope of the invention and I wish therefore to be limited not by the foregoing description, but on the contrary solely by the claims granted to me.

What I claim is:

1. A dial snap gage adapted to measure the diameter of large cylindrical pieces, said snap gage comprising a U-shaped frame having a minimum dimension of 24" between the extremities, a dial indicator gage mounted on one extremity of said U, a supporting member adjustably mounted on the inner surface of the U adjacent the center thereof, said supporting member having a plane surface adapted to rest upon a horizontally extending work piece and form the sole support for the gage on the work piece, said supporting member also serving as a pivot point about which said gage may be oscillated on the work piece and a pair of gaging anvils, one adjustably fixed in the second extremity of said U and the other mounted in the first extremity of said U to cooperate with said dial indicator gage.

2. A dial snap gage adapted to measure the diameter of large cylindrical pieces, said snap gage comprising a U-shaped frame having a minimum dimension of 24" between the extremities, a dial indicator gage mounted on one extremity of said U, a support adjustably mounted on the inner surface of the U adjacent the center thereof adapted to rest on a horizontally extending work piece, said support having a plane surface resting on the work piece and serving as a pivot for the gage, a pair of gaging anvils, one adjustably fixed in the second extremity of said U and the other mounted in the first extremity of said U to cooperate with said dial indicator gage, and a handle mounted on the exterior of said U-shaped frame centrally thereof and in alignment with said support whereby said gage may be readily oscillated about a plane substantially transverse to the axis of the work piece while supported on said support.

3. A dial snap gage adapted to measure the diameter of large cylindrical pieces, said snap gage comprising a U-shaped frame having a minimum dimension of 24" between the extremities, a dial indicator gage mounted on one extremity of said U, a support adjustably mounted on the inner surface of the U adjacent the center thereof and adapted to rest upon a horizontally extending piece being gaged and to support the weight of said snap gage, a pair of gaging anvils, one adjustably fixed in the second extremity of said U and the other mounted in the first extremity of said U to cooperate with said dial indicator gage, and means on the second mentioned extremity of said U-shaped frame for balancing the weight of said dial indicator gage.

4. A dial snap gage adapted to measure the diameter of large cylindrical pieces, said snap gage comprising a U-shaped frame having a minimum dimension of 24" between the extremities, a dial indicator gage mounted on one extremity of said U, a support adjustably mounted on the inner surface of the U adjacent the center thereof and adapted to rest upon a horizontally extending piece being gaged and to support the weight of said snap gage, and a pair of gaging anvils, one adjustably fixed in the second extremity of said U and the other mounted in the first extremity of said U to cooperate with said dial indicator gage, said anvils comprising relatively flat narrow bands extending in a direction parallel to the plane of said frame, said bands being of relatively great extent in the said plane whereby the adjusted position of said support is not critical, said bands being narrow so that oscillation of said frame about said support as a center will yield a minimum gage reading which is the diametrical measurement.

5. A dial snap gage adapted to measure the diameter of large cylindrical pieces, said snap gage comprising a U-shaped frame having a minimum dimension of 24" between the extremities, a dial indicator gage mounted on one extremity of said U, a support adjustably mounted on the inner surface of the U adjacent the center thereof, and adapted to rest upon a horizontally extending piece being gaged and to support the weight of said snap gage, a pair of gaging anvils, one adjustably fixed in the second extremity of said U and the other mounted in the first extremity of said U to cooperate with said dial indicator gage, said anvils comprising relatively flat narrow bands extending in a direction parallel to the plane of said frame, said bands being of relatively great extent in the said plane whereby the adjusted position of said support is not critical, and means on the second mentioned extremity of said U-shaped frame for balancing the weight of said snap gage about said support as a pivot point.

6. A dial snap gage adapted to measure the diameter of large cylindrical pieces, said snap gage comprising a U-shaped frame having a minimum dimension of 24" between the extremities, a dial indicator gage mounted on one extremity of said U, a support adjustably mounted on the inner surface of the U adjacent the center thereof, and adapted to rest upon a horizontally extending piece being gaged and to support the weight of said snap gage, a pair of gaging anvils, one adjustably fixed in the second extremity of said U and the other mounted in the first extremity of said U to cooperate with said dial indicator gage, said anvils comprising relatively flat narrow bands extending in a direction parallel to the plane of said frame, said bands being of relatively great extent in the said plane whereby the adjusted position of said support is not critical, means on the second mentioned extremity of said U-shaped frame for balancing the weight of said snap gage about said support as a pivot point and a handle on said frame opposite said support whereby said frame may be readily oscillated to lie in planes at opposite sides of the plane perpendicular to the work piece axis to thereby cause the dial gage to indicate a minimum when the gage frame is in a plane perpendicular to the work piece axis, said minimum indication being the true diameter of the work piece.

JOHN J. BISHOP.

References Cited in the file of this patent

UNITED STATES PATENTS

| Number | Name | Date |
|---|---|---|
| 601,721 | Vine | Apr. 5, 1898 |
| 1,635,908 | Stuart | July 12, 1927 |
| 1,821,398 | Simpson | Sept. 1, 1931 |
| 1,890,827 | Pratt | Dec. 13, 1932 |
| 2,419,433 | Aller | Apr. 22, 1947 |
| 2,448,106 | Mannerbrink et al. | Aug. 31, 1948 |

FOREIGN PATENTS

| Number | Country | Date |
|---|---|---|
| 483,677 | France | May 5, 1917 |
| 715,179 | France | Sept. 21, 1931 |
| 741,729 | France | Feb. 18, 1933 |
| 451,607 | Great Britain | Aug. 10, 1936 |
| 647,674 | Germany | July 9, 1937 |
| 376,586 | Italy | Nov. 18, 1939 |
| 240,633 | Switzerland | May 1, 1946 |

OTHER REFERENCES

Publication, American Machinist Announcement of Nilsson Gage, page 259, January 29, 1948 (copy in Library).